(No Model.)

E. P. LYNCH.
MOLD BOARD PLOW.

No. 412,110. Patented Oct. 1, 1889.

ON LINE x-x

ON LINE y-y

Witnesses,
N. W. Mortimer
N. R. Kennedy.

Inventor,
E. P. Lynch
By Phil. T. Dodge
Attorney.

N. PETERS, Photo-Lithographer, Washington, D. C.

UNITED STATES PATENT OFFICE.

EDWARD P. LYNCH, OF DAVENPORT, IOWA.

MOLD-BOARD PLOW.

SPECIFICATION forming part of Letters Patent No. 412,110, dated October 1, 1889.

Application filed December 22, 1888. Serial No. 294,386. (No model.)

*To all whom it may concern:*

Be it known that I, EDWARD P. LYNCH, of Davenport, in the county of Scott and State of Iowa, have invented certain Improvements in Mold-Board Plows, of which the following is a specification.

My invention relates to those plows in which the rear end of the mold-board is composed of a series of independent arms or slats adapted to support and turn the slice, as represented, for example, in my application for Letters Patent executed on the 8th day of October, 1888.

The present invention relates to various improvements on the type of plow herein represented; and it consists, more particularly, in the employment of supporting arms or slats, which are constructed of spring-steel or other highly-elastic metal, their rear ends being left free or unconnected and their forward ends firmly attached to a supporting-plate, whereby they are adapted to yield independently in the event of their encountering excessive resistance—screws or equivalent adjusting devices whereby their angular position may be varied at will—and in various other features of minor importance, as will hereinafter more fully appear.

Figure 1:
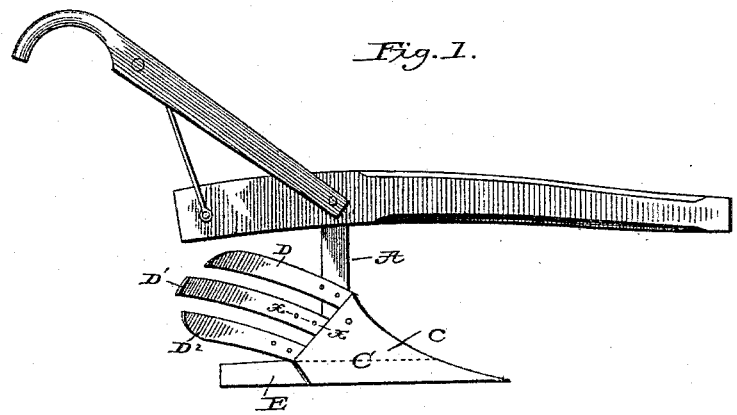
Figure 2:
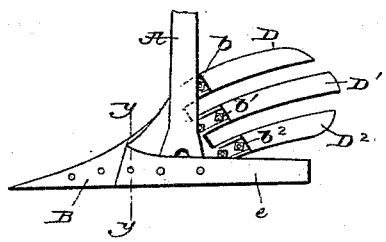
Figure 4:
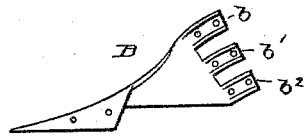
Figure 3:
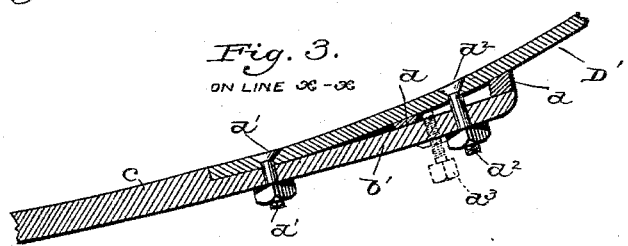
Figure 5:
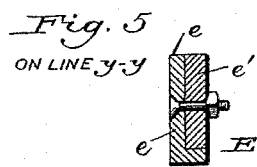
Figure 6:
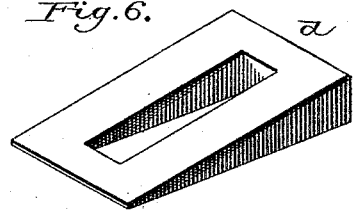
Figure 7:
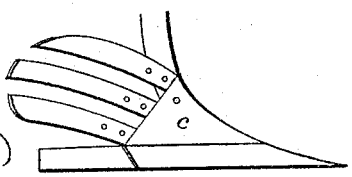

In the accompanying drawings, Figure 1 represents an elevation of a plow having my improvements incorporated therein, viewed from the furrow side. Fig. 2 is an elevation of the same from the land side. Fig. 3 is a section on the line $x$ $x$, showing the manner of adjusting the mold-board arms. Fig. 4 is an elevation from the land side of the foundation plate or support, to which other parts are secured. Fig. 5 is a cross-section on the line $y$ $y$ of Fig. 2. Fig. 6 is a perspective view of one of the wedges for adjusting the mold-board arms. Fig. 7 is an elevation of a plow in a slightly-modified form.

Except as to the details of the mold-board hereinafter described, my plow may be in all respects of ordinary construction.

The construction and arrangement of the beam, handles, and standard are foreign to my invention.

Referring to the accompanying drawings, A represents the plow-standard attached at its lower end to the landside, as usual.

B is a plate intended to sustain the share, landside, and mold-board sections, as hereinafter detailed.

C represents the share removably bolted to the plate B. Instead of terminating at the upper edge as usual, in the position indicated by the dotted lines in Fig. 1, it is formed integral with the upper portion $c$, forming the lower forward end of the mold-board. The portion $c$ may have precisely the same form on its surface and be arranged in precisely the same relation to the share as the corresponding portion of the ordinary mold-board. In other words, the share and the forward end of the mold-board present the ordinary surface form and act upon the soil in the ordinary manner, the only departure from the ordinary construction being in the formation of the share and the mold-board section $c$ in one piece instead of in separate parts, as usual, and this for a purpose which will presently appear.

The section $c$ is bolted removably in place on the base-section B. The plate can be dispensed with and the share made wide enough to take the place of the plate.

The section B is formed with rearwardly and upwardly curved lugs $b$ $b'$, &c., to which are bolted the series of arms D D', which form the rear portion of the mold-board. These arms have flat faces, and are curved in such manner and in such relation to each other that they jointly present a supporting-surface similar to that of the ordinary mold-board, adapted to support and turn the slice. At their forward ends, which are secured immovably in place, the arms lie flush with the face of the section $c$, of which they form a rearward continuation. I construct these rear arms of spring-steel or other highly-elastic metal, and of such strength or stiffness that while they will retain their original form under ordinary conditions they will yield under excessive resistance and then resume their positions when relieved therefrom.

It is to be particularly noted that the rear ends of the arms are free and unsupported, so that they may vibrate without resistance, and so, also, that the slots or spaces between them are left open or unobstructed at the rear end, thus allowing the earth to pass freely to the rear and avoiding the obstruction which would result from a connection between the arms.

Owing to the varying quality and condition of the soil, it is sometimes desirable to change the form or shape of the mold-board. I therefore provide means by which the arms D D' may be adjusted, so as to change their angle to the line of travel. These adjusting devices may be of any suitable character; but I recommend, as shown in Figs. 3 and 6, the employment of a wedge $d$ between each slat and the rear end of its supporting-lug. The arm is held in place upon the lug of the foundation-plate by two through-bolts $d'$ and $d^2$. The wedge is slotted longitudinally for the passage of the bolt $d^2$, which in drawing the parts together holds the wedge firmly in place. By loosening the bolt and adjusting the wedge endwise the position of the arm may be varied at will.

In place of the wedge a bolt $d^3$ may be tapped through the supporting-lug to bear against the inner face of the arm D to force the same outward. By adjusting the bolts $d^2$ and $d^3$ in relation to each other the arm D may be adjusted and firmly fixed in position.

While it is preferred to form the share and the mold-board point $c$ in one piece it is to be understood that the elastic arms or slats are not dependent upon this construction, and that they may be applied, as shown in Fig. 7, to plows having the mold-board section $c$ independent of the share, as in my previous application.

E represents the landside of the plow, consisting of an outer wearing-plate $e$, removably bolted to a sustaining-arm $e'$, of wrought-iron or similar material, which is in turn bolted at its forward end to the side of the foundation-plate B.

I am aware that it is old to construct mold-board plows with the rear portion of the mold-board composed of a series of arms or slats.

I am also aware that it is old to combine a rigid or unbroken mold-board with screws by which it may be adjusted bodily to change its angle in the line of travel.

I am also aware that a mold-board plow has been constructed with longitudinal rods permanently attached at their forward ends and rigidly secured at their rear ends by nuts to admit of their angle being changed.

I believe myself to be the first to construct a mold-board plow the rear portion of which is composed of flexible arms with free disconnected rear ends and having their forward ends secured by devices to admit of their positions being changed independently, whereby I am enabled to produce a mold-board plow which may be changed in form, changed in its relation to the line of travel, and which is at the same time flexible at the rear end and adapted to permit the free delivery of the slice.

I also believe myself to be the first to construct a plow in which the share and the forward portion of the mold-board for erecting the slice are formed in one piece and combined with flexible independent arms extending thence to the rear.

Having thus described my invention, what I claim is—

1. The mold-board plow comprising the share, the solid forward end of the mold-board, the series of independent elastic arms extending rearward from said solid portion and each free at its rear end, and the adjusting devices at the forward ends of the individual arms, whereby the rear end of the mold-board is given a slatted form, rendered elastic, and adapted to be changed in shape at will.

2. In a mold-board, the combination of a series of elastic arms or slats forming the rear part of the board and free to vibrate at their rear ends, a solid support to which the arms are bolted at their forward ends, and intermediate adjusting devices for changing the position of the individual arms to or from the land, whereby an elastic board of variable form is produced.

In testimony whereof I hereunto set my hand, this 27th day of October, 1888, in the presence of two attesting witnesses.

EDWARD P. LYNCH.

Witnesses:
L. H. THIELE,
GEORGE J. BARKER.